July 5, 1960
E. R. ANDERSON
2,943,659
PEACH HALF PITTER
Filed Aug. 6, 1956
5 Sheets-Sheet 3
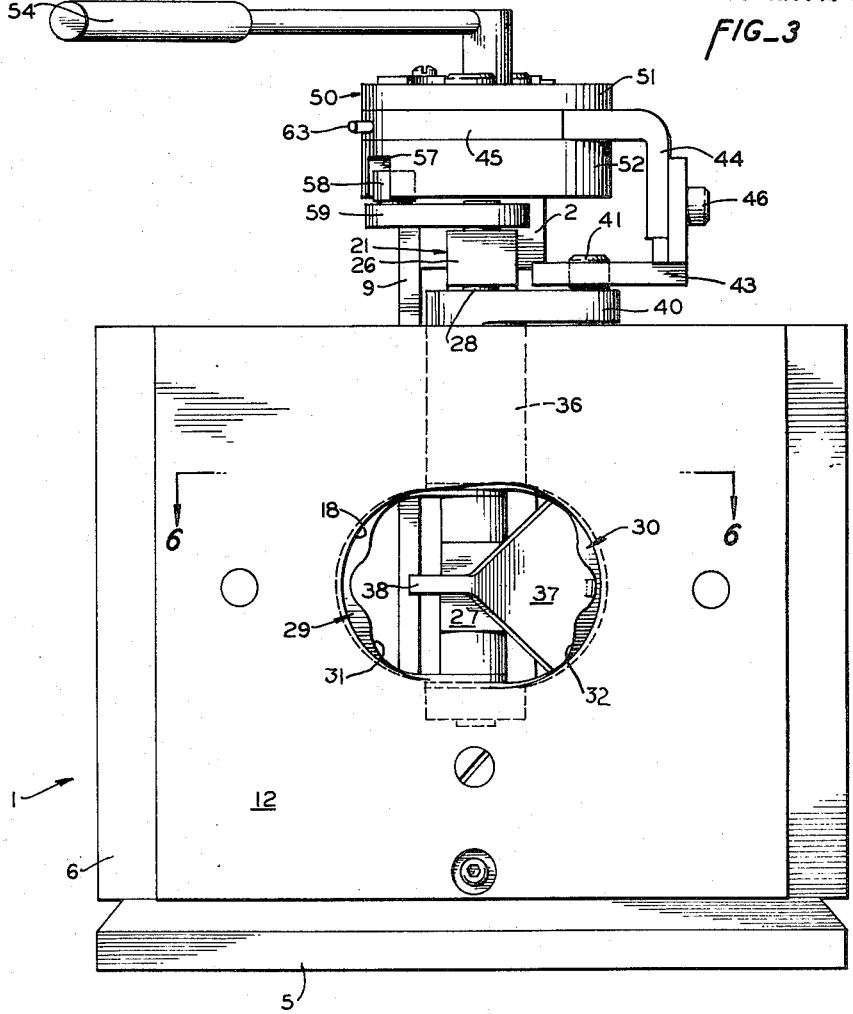
FIG_3
INVENTOR.
EARL R. ANDERSON
BY
Bazken, Mohler & Wood
ATTORNEYS July 5, 1960  E. R. ANDERSON  2,943,659
PEACH HALF PITTER
Filed Aug. 6, 1956  5 Sheets-Sheet 4
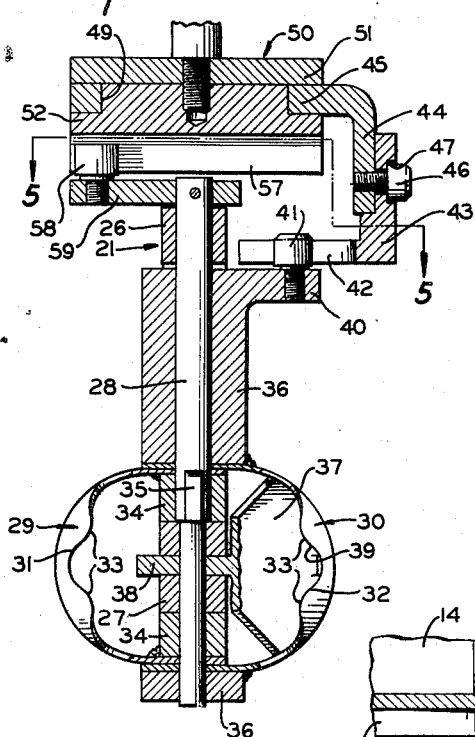
FIG_4
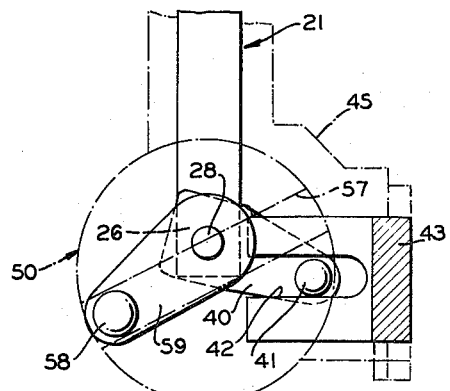
FIG_5
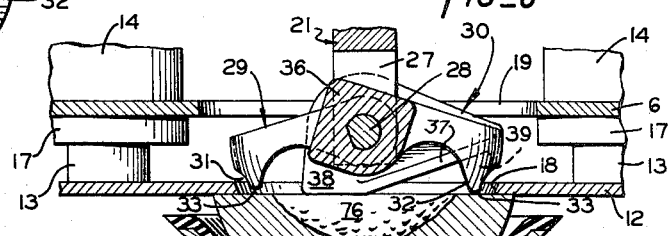
FIG_6
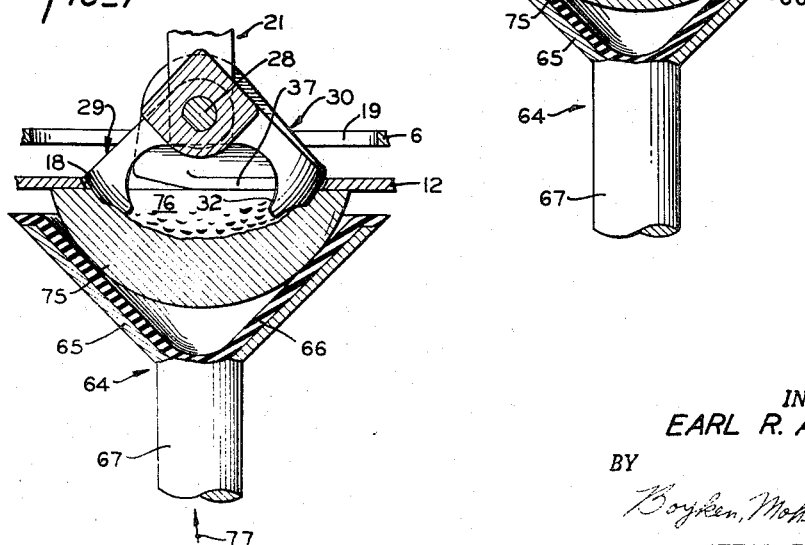
FIG_7
INVENTOR.
EARL R. ANDERSON
BY
Boyken, Mohler & Wood
ATTORNEYS July 5, 1960
E. R. ANDERSON
2,943,659
PEACH HALF PITTER
Filed Aug. 6, 1956
5 Sheets-Sheet 5
FIG_8
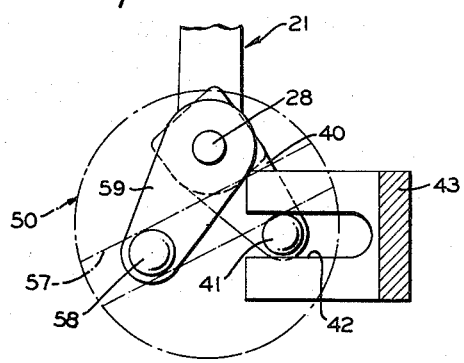
FIG_9
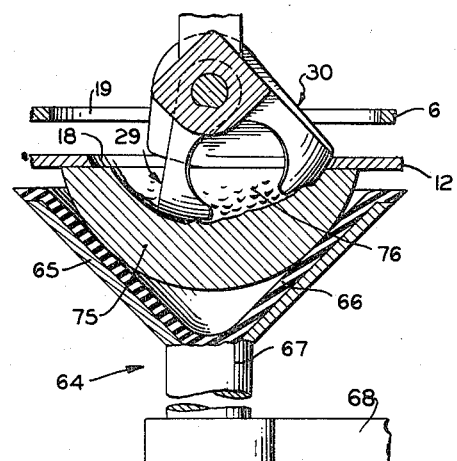
FIG_10
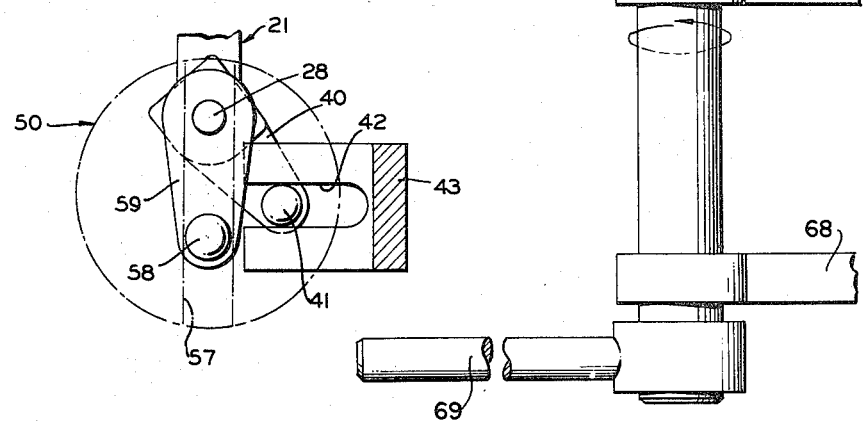
FIG_11
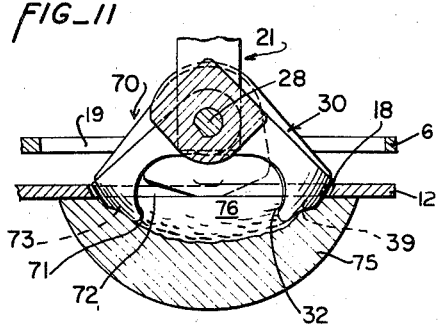
INVENTOR.
EARL R. ANDERSON
BY
Boyken, Mohler & Wood
ATTORNEYS

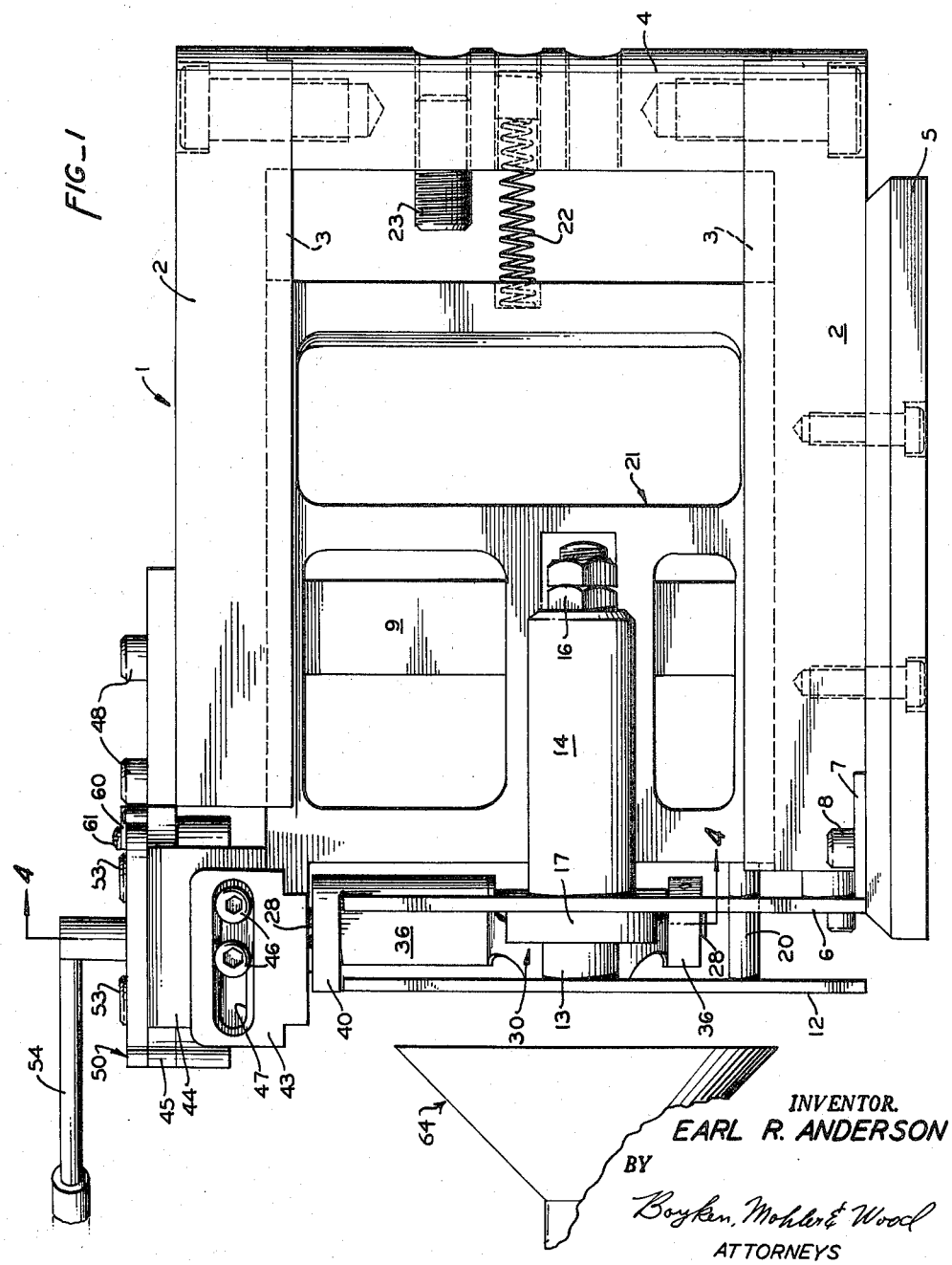

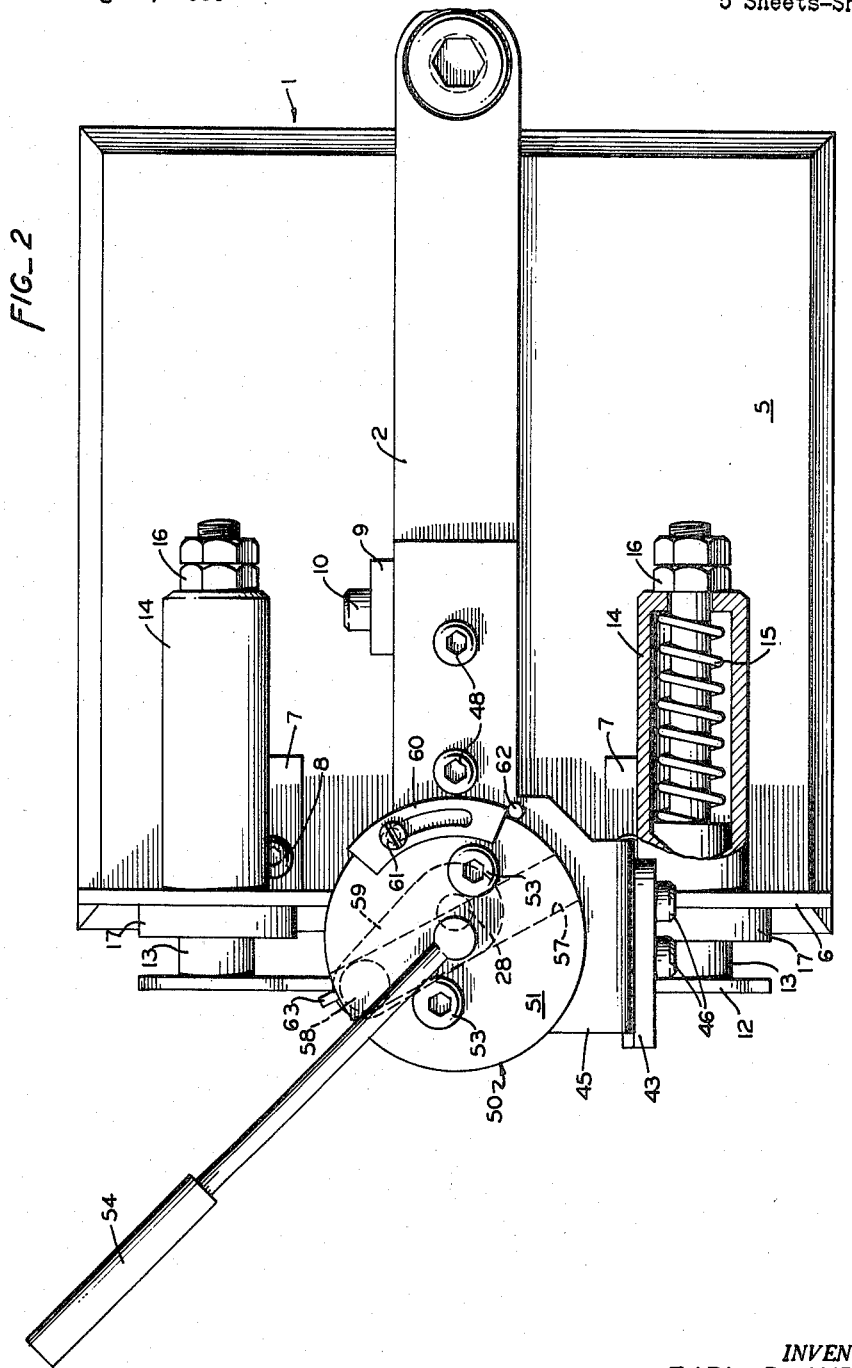

United States Patent Office 2,943,659
Patented July 5, 1960

2,943,659

PEACH HALF PITTER

Earl R. Anderson, Campbell, Calif., assignor to Filper Corporation, Richmond, Calif.

Filed Aug. 6, 1956, Ser. No. 602,097

9 Claims. (Cl. 146—28)

This invention relates to method and apparatus for pitting peaches and the like and more particularly to removing pits from peach halves.

One of the objects of this invention is the provision of a novel method and apparatus for the method separating a pit from a peach half. The apparatus herein described is of the same general type and bears some features in common with the "Peach Pitter" disclosed in copending application, Serial No. 244,795, filed September 1, 1951, now Patent No. 2,775,278.

Prior art apparatus for removing pits from peaches, especially of the clingstone variety, may take the recently developed form shown in United States Letters Patent No. 2,664,127, issued December 29, 1953 to Joseph Perrelli, in which a whole pit is removed from a whole peach in a single operation including bisecting the peach to the pit and gripping the pit during the pitting operation. Apparatus of this type may not be entirely effective in some instances where the pit is defective.

For example, in some instances, the pits may be naturally split or fractured or both. The natural splitting of a pit normally occurs in the plane of the suture of the pit, and where the pit is so split, the gripping of both pit halves at the same time and holding them while the flesh or meat adhered thereto is forceably sheared from the pit halves by effecting relative movement between the pit halves and the meat, is not always possible if one or both pit halves are fractured, the application of a gripping force on such pit usually results in the collapse of the pit to a greater or lesser degree, and severance of the flesh from the halves in the manner above described cannot usually be effected.

Instances where naturally split or fractured halves occur may be more or less frequent according to weather conditions during the development of the peaches, and heretofore it has been the practice to cut the pit halves from the flesh adhered thereto by conventional methods. However, such methods result in losing the advantages of pitting by the method of causing relative movement between the pit and the flesh of each peach so as to shear the flesh from the pit close to the surface of the pit. In the conventional method, the pitting knife or knives do not usually engage the pit but come as close as possible to the latter. However, inasmuch as pits are of various sizes the pitting knife or knives are usually designed to operate on the largest sized pits without engaging them, with the result that an unnecessarily large amount of flesh is removed in a pitting operation irrespective of attempts to control movement of the pitting knife or knives to follow the contour of pits of different sizes.

Another problem that is posed in the pitting of clingstone peaches is the fact that where the pits are split during the development of the peaches, it is not unusual to find that the flesh is discolored, and sometimes spoiled along the edge of each pit along its suture. Where the pit halves are cut out of the peach halves by the conventional method that leaves a layer of flesh on the pit, it is not so difficult to remove this discolored or spoiled portion along with the layer.

The present invention provides a means and method for removing pit halves, whether naturally split, fractured, or imperfectly formed, together with any discolored or spoiled portion of the flesh along the suture of the pit, by causing a relative movement between the pit and the flesh adhered thereto and holding the pit half against collapse under compressive force during such movement. Thus the pit half is removed from each half of the peach substantially free from loss of sound flesh, next to the pit half, and one provision of the machine and method adapted to accomplish the results is one of the objects of the invention.

Other objects and advantages will become apparent from the description taken in connection with the accompanying drawings, in which:

Fig. 1 is a side elevational view, in full size, of the major portion of the apparatus of this invention;

Fig. 2 is a top plan view of the apparatus of Fig. 1;

Fig. 3 is a front end elevational view of the apparatus of Fig. 1;

Fig. 4 is a sectional view taken substantially along line 4—4 of Fig. 1;

Fig. 5 is a sectional view taken substantially along line 5—5 of Fig. 4 and showing the position of the driving mechanism of the apparatus at its original position;

Fig. 6 is a sectional view taken substantially along line 6—6 of Fig. 3 and showing the position of pitting elements as related to the driving mechanism of Fig. 5;

Fig. 7 is a sectional view similar to Fig. 6 showing the position of the pitting elements during the first step of the pitting operation;

Fig. 8 is a sectional view similar to Fig. 5 showing the position of the driving mechanism corresponding to the position of the pitting elements of Fig. 7;

Fig. 9 is a sectional view similar to Fig. 6 showing the position of the pitting elements during the final step in the pitting operation;

Fig. 10 is a sectional view similar to Fig. 5 showing the position of the driving mechanism corresponding to the pitting element position of Fig. 9; and, Fig. 11 is a view similar to Fig. 7 showing a modified form of one of the pitting elements.

In detail, the apparatus of this invention comprises a frame, generally designated 1 (Figs. 1, 2, 3), composed of a pair of generally horizontal, spaced guide members 2 having opposedly inwardly opening grooves 3 therein. Members 2 are rigidly secured in said spaced relation by a back frame member 4 (Fig. 1) and are rigidly fixed to a horizontal base plate 5. At the forward end of the base plate 5 the same is provided with an upstanding fixed plate 6 which may be rigidly secured to base 5 as by brackets 7 and screws 8. Since the upper end of plate 6 is not secured to upper guide member 2, the forward ends of said guide members may be held in spaced relationship by a side strap 9 (Figs. 1, 2, 3) secured thereto by screws 10.

Mounted forwardly of fixed plate 6 and in a spaced, parallel relation thereto is a movable plate 12. Plate 12 is horizontally reciprocable with respect to plate 6 inasmuch as it is mounted on a pair of horizontal rods 13 which rods, in turn, reciprocably extend through spring units 14 secured to the plate 6. Spring 15 (Fig. 2) in each spring unit 14 urge plate 12 away from plate 6 to the extent limited by stop nuts 16 threadedly received on rods 13. The inward movement of plate 12 toward plate 6 against the force of springs 15 is limited by spacer collars 17 surrounding rods 13 and positioned between plate 12 and plate 6. Plates 12 and 6 are formed with horizontally aligned openings 18, 19, respectively (Figs. 3, 6), for a purpose to be described, Opening 19 may be formed slightly larger than opening 18 and the latter is slightly larger than the largest pit to be removed.

Extending rearwardly from movable plate 12 through an opening formed in plate 6 is a push rod 20 (Fig. 1). The forward end of push rod 20 is secured to plate 12 and its rearwardly directed end is adapted to engage the front end of a slide member 21 which is slidably received in grooves 3 in guide members 2. Slide member 21 is urged to its forward position (to the left in Fig. 1) by a helical spring 22 interposed between the rear end thereof and back member 4. The rearward travel of slide member 21 is limited by an adjustable screw 23 projecting forwardly from back member 4. The forward movement of member 21 is, of course, limited by stop nuts 16 in the same manner as movable plate 12. It will be noted that the original or forward position of member 21 with respect to plate 12 may be adjusted by interposing push rods 20 of different lengths therebetween.

The forward end of slide member 21 is formed to provide a pair of vertically spaced bearings 26, 27 (Figs. 3, 4) in which the vertical drive shaft 28 is journalled. Shaft 28 is free to rotate in bearings 26, 27 and moves longitudinally of frame 1 with slide member 21. It will be noted from Fig. 6 that when slide member 21 is in its original or forward position, shaft 28 is positioned in the space between plates 6 and 12.

In Fig. 4 it will be seen that the lower end of shaft 28 carries a pair of arcuately formed, opposed pit holding elements or blades 29, 30. Blades 29, 30 are substantially U-shaped and their forwardly directed edges are sharpened to provide cutting edges 31, 32. Said cutting edges may be formed to the somewhat sinusoidal curve shown with their central portions recessed to provide a pair of nibs 33 on either side thereof. Preferably edges 31 are sharpened substantially throughout their arcuate extent.

The nibs 33 in effect form two portions which are the leading cutting edges of blades 29, 30. As will appear later, when blades 29, 30 cut into the flesh of a peach half adjacent the pit they leave an uncut area at the recess between the nibs 33.

Blade 29, which will hereinafter be referred to as the cutting blade, is provided at its inner ends with a pair of opposed bosses 34 having aligned openings for receiving the lower part of shaft 28 therethrough. Bosses 34 are secured as by welding to blade 29 and a flat 35 may be formed on shaft 28 for securing one of said bosses thereto by means of a key or set screw. In this manner, blade 29 is fixed to shaft 28 for rotation therewith.

The inner ends or legs of blade 30, hereinafter known as the holding blade, are provided with a pair of opposed bosses 36 (Fig. 4) which also have aligned openings for receiving shaft 28. Bosses 36 are secured as by welding to blade 30 and are rotatable with respect to shaft 28. In effect, as seen in Fig. 4, blade 29 may rotate with shaft 28 inside of the arcuate extent of blade 30. Blade 30 is further provided with an integral web 37 (Figs. 3, 4, 6) extending inwardly from the outer arcuate portion of blade 30 to a central flange 38 positioned between bosses 34 and rotatably received on shaft 28. The outer portion of web 37 is spaced rearwardly from cutting edge 32 where it is secured to the arcuate portion of blade 30. Web 37 and the arcuate portion of blade 30 thereby form a pocket 39 (Figs. 4, 6) for a purpose to be described.

In Figs. 3, 4, 5 it will be noted that the upper end of upper boss 36 is formed with a crank arm 40 having a follower 41 projecting upwardly therefrom at a point eccentric to shaft 28. Follower 41 is slidably received in an elongated, horizontal slot 42 formed in a fixed bracket 43. Bracket 43 is adjustably secured to the downwardly extending leg 44 of a horizontal bearing member 45 as by screws 46 extending through slot 47 in bracket 43 (Figs. 1, 4). Bearing member 45 is secured to upper guide member 2 by screws 48 (Figs. 1, 2). The relative angular position of crank arm 40 and therefore of holding blade 30 may be adjusted by sliding bracket 43 forwardly or rearwardly and securing it in the desired position by screws 46.

It will be noted in Fig. 4 that the axis of the cylindrical bearing 49 of member 45 is positioned in the central vertical plane of the slide member 21. A driving head 50 comprising an upper disc 51 and a lower circumferentially grooved disc 52 is journalled for rotation on bearing surface 49 of bearing member 45. Said discs may be secured together by screws 53 (Figs. 1, 2) and are provided with a handle 54 or any other suitable means for rotating head 50 in bearing member 45. The underside of disc 52 is provided with a horizontally elongated slot 57 (Figs. 2, 4, 5) which slidably receives a follower 58 carried by a crank arm 59. Arm 59 is pinned to the upper end of shaft 28 for rotation therewith and follower 58 is eccentric with respect to said shaft. Rotation of driving head 50 by handle 54 thereby rotates shaft 28 through slot 57, follower 58, and crank arm 59. In this manner, cutting blade 29 may be rotated independently of holding blade 30.

Driving head 50 may be provided with a limit stop 60 (Fig. 2) adjustably secured thereto by a screw 61. Limit stop 60 is adapted to engage at its opposite ends a pair of opposed stops 62, 63 for setting both the initial position of blade 29 and for limiting the arc of travel of said blade. As previously described, the initial position of blade 30 may be adjusted by the adjustment of bracket 43.

Referring to Figs. 1, 6, 7 and 9, peach holding means, generally designated 64, are provided on the side of plate 12 opposite blades 29, 30. Said peach holding means may comprise a cup member 65 having a concave friction gripping surface 66 of rubber or the like mounted on the end of a shaft 67 supported in a pair of bearings 68 (Fig. 9) for rotation coaxially of openings 18, 19.

Bearings 68 may be secured to frame 1 or carried by any other structure fixed relative to the frame of the pitting apparatus. Shaft 67 is also slidable in bearings 68 toward and away from plate 12 and is provided with a handle 69 (Fig. 9) for rotating and translating said shaft and cup 65.

In operation, the half 75 (Figs. 6, 7, 9) of a peach which has been bisected along its sutural plane is presented to the forward face of movable plate 12 with the pit 76 adhering to said peach half arranged generally centrally of opening 18 and being exposed therethrough. In this position, it will be noted that the sutural plane of the peach half and the pit correspond generally to the plane of movable plate 12 and the stem and blossom ends of the pit are adjacent to blades 29, 30. The peach holding means 64 is then urged into engagement with peach half 75 and toward plate 12 along the axis of cup 65 which is also in the generally central axis of peach half 75 and pit 76 normal to their sutural plane.

At the first or original position shown in Fig. 6 it will be noted that the projecting nibs 33 of the cutting edges 29, 30 are adjacent the flat surface of the peach half 75 and just outside the stem and blossom ends of pit 76. The corresponding position of the elements of the mechanism for driving pitting elements 29, 30 is shown in Fig. 5.

Movable plate 12 is then urged toward fixed plate 6 by pressing on peach half 75 with peach holding means 64 in the direction indicated by arrow 77 in Fig. 7. This rearward movement of plate 12 is, of course, limited by collars 17 (Figs. 2, 6). In moving rearwardly plate 12 drives slide member 21 back against the force of spring 22 (Fig. 1) through push rod 20. Slide 21 carries drive shaft 28 of the blades with it thereby displacing said shaft with respect to the other elements of the blade driving mechanism. Since followers 41 and 58 are prevented from any substantial rearward movement by slots 42 and 57 respectively, which are held stationary during the above movement, the effect of moving the shaft 28 rearwardly is to rotate crank arms 40 and 59 thereby moving blades 29, 30 toward each other. Blades 29, 30 are moved to the position shown in Fig. 7 around opposite ends of pit 76 and nibs 33 actually cut into the flesh of peach half 75 adjacent said pit. The position of crank arms 40, 59 corresponding to this position of blades 30, 29, is shown in Fig. 8.

In the event the pit 76 is smaller than the largest pit that may be accommodated by the pitting elements 29, 30, the same may be further closed against the pit by grasping the rear of slide member 21 and retracting it further, independently of movable plate 12.

The configuratiion of cutting edges 31, 32 are such that the blades 29, 30 do not make a full cut around the pit 76, but the recess between nibs 33 leaves part of the pit adhered to the peach half. It is desirable that as much of the pit remain adhered to the peach as possible for the following pitting step consistent with relieving the edges of the pit and trimming the pit cavity.

It will be noted that holding blade 30 has been rotated sufficiently to bring web 37 thereof into contact with the exposed surface of pit half 76 (Fig. 7). One end of pit 76 is therefore received and held in the pocket 39 formed between the blade 30 and said web.

When the blades 29, 30 are in the position shown in Fig. 7, a rotation of driving head 50 by handle 54 will result in rotating crank arm 59 and shaft 28 and the blade 29 will move over the convex side of the pit toward the end thereof that is held in pocket 39 between blade 30 and web 37 and to the position substantially as shown in Fig. 9.

In this position as shown in Fig. 9 the pit may be partially forced out of its pit cavity in the fruit half and is clamped between blade 29 and web 37. If the pit is fractured, it will not be collapsed since no compressive pressure has been placed on it in an edgewise direction, as would be the case were an attempt made to grip it at opposite edges between opposed jaws or the like.

Blade 30 is held stationary during movement of blade 29 to the position shown in Fig. 9 and stop 63 (Fig. 2) may be positioned to limit movement of blade 29 past said position. Fig. 10 shows the position of driving head 50, slot 57, follower 58 and crank arm 59 when blades 29, 30 are in the position shown in Fig. 9.

With the pit so held, peach holder 64 is rotated with handle 69 about its aforementioned central axis as shown by arrow 78 (Fig. 9) thereby rotating peach half 75 with it. This rotation of peach half 75 with respect to the held pit 76 shears the remaining adhered portion of the pit loose from the peach half. At the same time, since knives 29, 30 are held stationary, said knives trim the pit cavity along the edges of the pit to remove any damaged or otherwise undesirable peach flesh.

In Fig. 11 one of the pitting elements 70, modified from its originally described form, is shown in conjunction with element or blade 30 and the remaining associated structure. Element 70 is in the form of an arcuate or U-shaped blade having a similar cutting edge 71 and mounted in a manner similar to blade 29. Blade 70 is also formed with an integral central web 72 for providing a pocket 73 adjacent cutting edge 71 similar to the pocket 39 of blade 30.

In this manner both ends of the pit 76 may be held in pockets 39, 73 to prevent rotation of said pit during the aforementioned rotation of peach half 75. Since a pit 75 is generally of an ovoid shape it will be adequately gripped and held by this means at its ends and cutting edges 32, 71 extend into the pit cavity sufficiently to trim the edge of the same during rotation of peach half 75.

In this modified form, there is no substantial cutting of the pit away from the body of the fruit, and since substantially the entire exposed face of the pit abuts or is held against the webs 37, 72 with the opposite side supported by the flesh of the peach half, the pit will not collapse even were a certain amount of compressive force applied by the blades 30, 70. The pit itself may, in this form of the invention limit the movement of the blades toward each other, and upon rotation of the blades as a unit about the axis of shaft 67 or upon rotation of shaft 67 while blades 30, 70 are held slanting, the pit half will be sheared from the body of the fruit, and at the same time, the knives will function to trim any discoloration or spoiled flesh from the fruit half along the edge of the pit half. Upon moving the blades back to open position and retracting the member 64 from plate 12 the peach half and the pit will be released for removal from the pitter.

The cavity of a peach half pitted in accordance with the method and apparatus of this invention retains the desirable characteristics of a rough, colored surface and yet is trimmed clean of pit fragments and damaged flesh. The apparatus of this invention, in effect, combines the best features of cutting and twisting the pit from a peach half with more capable means for holding a pit during the process of twisting it loose from the peach half. Although the invention has been described and illustrated in detail, such should not be taken as restrictive thereof since it is obvious that many modifications could be made therein without departing from the spirit and scope of the invention.

I claim:

1. A clingstone peach pitter for removing the half pit adhered to the walls of the pit cavity in a clingstone peach that has been bisected to provide a half peach having a planar cut face around said pit, comprising; peach holding means movable into holding relation with the outer surface of the flesh of such half peach, pit holding means adjacent to said peach holding means movable into pit holding relation with said pit in a half peach when the latter is held by said peach holding means, means connected with said peach holding means for rotating the latter relative to said pit holding means when a peach half is held by said peach holding means with its pit held by said pit holding means for shearing the connection between said pit and the pit cavity of said peach half, and cutting means stationary relative to said peach holding means having a cutting edge facing substantially in the direction of the outline of the said pit cavity along the cut face of the peach half and extending into said peach half along and transversely across the edge of said pit when said peach holding means is so rotated for trimming off the portion of said peach half around said pit and along the edge of said pit cavity.

2. A clingstone peach pitter for removing the half pit adhered to the walls of the pit cavity in a clingstone peach that has been bisected to provide a half peach having a planar cut face around said pit, comprising; peach holding means movable into holding relation with the outer surface of the flesh of such half peach, pit holding means adjacent to said peach holding means movable into pit holding relation with said pit in a half peach when the latter is held by said peach holding means, means connected with said peach holding means for rotating the latter relative to said pit holding means when a peach half is held by said peach holding means with its pit held by said pit holding means for shearing the connection between said pit and the pit cavity of said peach half, and cutting means stationary relative to said peach holding means having a cutting edge facing substantially in the direction of the outline of the said pit cavity along the cut face of the peach half and extending into said peach half along and transversely across the edge of said pit when said peach holding means is so rotated for trimming off the portion of said peach half around said pit and along the edge of said pit cavity, said cutting means being part of said pit holding means and being movable therewith into said peach half upon movement of said pit holding means into pit holding relation.

3. A clingstone peach pitter for removing the half pit from the pit cavity of a clingstone peach that has been bisected to provide a half peach having a planar cut face around the exposed side of the half pit in said cavity, comprising; an arcuately extending generally U-shaped blade supported for rotation about an axis extending through the ends of said blade and to a position in such pit cavity with such half pit held between the sides of said U, means adjacent to said blade for supporting a peach half for movement of said blade to said position, peach gripping means movable into gripping relation with the convex side of said peach half for rotating said half relative to said blade, means connected with said peach gripping means for so rotating the latter relative to said blade upon said blade being in position with said pit held between the sides of the latter.

4. A clingstone peach pitter for removing the half pit from the pit cavity of a clingstone peach that has been bisected to provide a half peach having a planar cut face around the exposed side of the half pit in said cavity, comprising; an arcuately extending generally U-shaped blade supported for rotation about an axis extending through the ends of said blade and to a position in such pit cavity with such half pit held between the sides of said U, means adjacent to said blade for supporting a peach half for movement of said blade to said position, peach gripping means movable into gripping relation with the convex side of said peach half for rotating said half relative to said blade, means connected with said peach gripping means for so rotating the latter relative to said blade upon said blade being in position with said pit held between the sides of the latter, pit engaging means separate from said blade supported for movement into a position abutting the exposed side of said pit half when the said blade is moved to said position with the pit between the sides of said blade.

5. A clingstone peach pitter for removing the half pit from the pit cavity of a clingstone peach that has been bisected to provide a half peach having a planar cut face around the exposed side of the pit half in said cavity comprising; pit engaging means rotatable about an axis for arcuate movement into engagement with an edge of the half pit of such half peach and over said exposed side of such pit and the side of the latter that is in said pit cavity, peach positioning means adjacent to said pit holding means for positioning the cut face of a peach half for said engagement of its pit by said pit engaging means upon said rotation of the latter, peach rotating means movable into frictional engagement with a peach so positioned on said peach positioning means and supported for rotation relative to said pit engaging means for rotating said peach half and means extending into said pit cavity and across the edge of such pit opposite to said first mentioned edge for coacting with said pit engaging means to hold said pit against rotation with said peach half when said peach rotating means is rotated.

6. A clingstone peach pitter for removing the half pit from the pit cavity of a clingstone peach that has been bisected to provide a half peach having a planar cut face around the exposed side of the pit half in said cavity comprising; pit engaging means rotatable about an axis for arcuate movement into engagement with an edge of the half pit of such half peach and over said exposed side of such pit and the side of the latter that is in said pit cavity, peach positioning means adjacent to said pit holding means for positioning the cut face of a peach half for said engagement of its pit by said pit engaging means upon said rotation of the latter, peach rotating means movable into frictional engagement with a peach so positioned on said peach positioning means and supported for rotation relative to said pit engaging means for rotating said peach half and means extending into said pit cavity and across the edge of such pit opposite to said first mentioned edge for coacting with said pit engaging means to hold said pit against rotation with said peach half when said peach rotating means is rotated, the said means extending into said pit cavity including a cutter having an edge facing generally longitudinally of the edge of said pit for trimming the edges of said pit cavity upon rotation of said peach half.

7. In a clingstone peach pitter for removing the half pit from the pit cavity of a clingstone peach that has been bisected to provide a half peach having a planar cut face around the exposed side of the half pit in said cavity; an arcuately extending blade generally conforming in contour to the curvature of the convex side of such half pit and supported for movement along said convex side of such half pit when the cut face of such half peach is presented to said blade, means carried by said blade for movement therewith and into engagement with the exposed side of said half pit when said blade is moved along the convex side of the latter for limiting said movement of said blade and means connected with said blade for so moving the latter.

8. A pitter for separating the half pit from a peach that has been bisected in the plane of the suture thereof to provide a peach half and a half pit adhered thereto having substantially flat surfaces in said plane, said pitter comprising; a frame, a plate mounted on said frame against one side of which said flat surface of said peach half may be positioned, an opening provided in said plate through which said half pit may be exposed when said peach half is so positioned, peach holding means mounted on said one side of said plate for movement into holding engagement with the outer convex surface of said peach half, pit holding means including a pair of opposed, arcuately formed blades mounted on said frame on the other side of said plate for movement through said opening, around opposite ends of said half pit, and toward each other adjacent the convex surface of said half pit, one of said blades having a stop member secured thereto for engaging said flat surface of said half pit for limiting said movement of said one blade, means for so moving said blades, means for so moving said peach holding means, and means for rotating said peach holding means relative to said pit holding means about an axis generally centrally of said opening and normal to said plate for rotating said peach half with respect to said pit.

9. In a drupe pitter, a support adapted to engage the cut face of a half drupe around the pit leaving said pit exposed, a pitting knife adjacent to said support, means supporting said knife for rotation about an axis and into the flesh of said half drupe closely adjacent to and at one side of said pit when said half drupe is in said engagement with said support with its pit so exposed, peach gripping means engageable with the convex side of said half drupe when the latter is against said support, and means for rotating said peach gripping means about an axis extending angularly relative to the axis of rotation of said knife after said movement of said knife into said flesh and while said knife is in the latter to effect trimming of the pit cavity of said drupe half and freeing said pit from said half.

References Cited in the file of this patent

UNITED STATES PATENTS

| | | |
|---|---|---|
| 1,605,532 | Duncan | Nov. 2, 1926 |
| 1,794,479 | Smith | Mar. 3, 1931 |
| 2,664,127 | Perrelli | Dec. 29, 1953 |
| 2,775,278 | Anderson | Dec. 25, 1956 |
| 2,775,279 | Perrelli | Dec. 25, 1956 |
| 2,880,774 | Perrelli | Apr. 7, 1959 |